United States Patent [19]

Byram et al.

[11] Patent Number: 5,295,409
[45] Date of Patent: Mar. 22, 1994

[54] REMOTE CONTROL LEVER MODULE

[75] Inventors: Robert J. Byram, Grand Blanc; Daniel A. Crawford, Burton; Steven A. Kornburger, Waterford, all of Mich.; Kevin R. Keegan, Hilton, N.Y.; Daniel F. Smith, Conesus, N.Y.; Donald G. Witzel, Fairport, N.Y.

[73] Assignee: General Motors Corporation, Detroit, Mich.

[21] Appl. No.: 47,899

[22] Filed: Apr. 19, 1993

Related U.S. Application Data

[60] Division of Ser. No. 692,375, Apr. 26, 1991, Pat. No. 5,233,882, which is a continuation-in-part of Ser. No. 552,173, Jul. 12, 1990, abandoned.

[51] Int. Cl.⁵ ............................................. G05G 1/14
[52] U.S. Cl. ........................................ 74/514; 74/512; 74/560; 123/399; 192/1.56; 307/10.1
[58] Field of Search ............................ 74/512–514, 74/560; 123/399, 361; 340/453; 192/1.56, 1.43; 180/335; 307/10.1, 9.1; 200/61.89

[56] References Cited

U.S. PATENT DOCUMENTS

| | | | |
|---|---|---|---|
| 1,238,126 | 8/1917 | Fulghum | 74/512 X |
| 1,273,186 | 7/1918 | Russell et al. | 74/512 X |
| 2,192,714 | 3/1940 | Norman et al. | 74/512 X |
| 3,702,458 | 11/1972 | Capachietti et al. | 340/453 |
| 3,757,758 | 9/1973 | Stoltman | 123/198 DB |
| 4,528,590 | 7/1985 | Bisacquino et al. | 74/512 X |
| 4,566,418 | 1/1986 | Yamamoto et al. | 123/479 |
| 4,616,504 | 10/1986 | Overcash et al. | 73/118.1 |
| 4,640,248 | 2/1987 | Stoltman | 423/399 |
| 4,733,214 | 3/1988 | Andresen | 338/128 |
| 4,853,556 | 8/1989 | Pfalzgraf et al. | 307/10.1 |
| 4,869,220 | 9/1989 | Imoehl | 123/399 |
| 4,883,037 | 11/1989 | Mabee et al. | 123/399 |
| 4,942,949 | 7/1990 | Dai | 74/512 X |
| 4,944,269 | 7/1990 | Imoehl | 123/399 |
| 4,958,607 | 9/1990 | Lundberg | 123/399 |
| 4,976,166 | 12/1990 | Davis et al. | 74/512 |
| 5,013,930 | 5/1991 | Spakowski et al. | 307/10.1 |

FOREIGN PATENT DOCUMENTS

| | | | |
|---|---|---|---|
| 1452516 | 9/1966 | France | 74/560 |
| 60-045729 | 3/1985 | Japan | 74/513 |

*Primary Examiner*—Vinh T. Luong
*Attorney, Agent, or Firm*—Charles K. Veenstra

[57] ABSTRACT

A remote control lever module comprising a shaft rotatably mounted on a support. A friction pad has a pair or surfaces each of which frictionally resists rotation of the shaft with respect to the support and permits relative rotation between the shafts and the support. A bearing assembly is loosely fit about the shaft to assure that the shaft may rotate in the support.

3 Claims, 8 Drawing Sheets

REMOTE CONTROL LEVER MODULE

This application is a division of application Ser. No. 07/692375 filed Apr. 26, 1991, now U.S. Pat. No. 5,233,882 issued on Aug. 10, 1993 which is a continuation-in-part of application Ser. No. 7/552173 filed Jul. 12, 1990.

TECHNICAL FIELD

This invention relates to a remote control lever module for sensing movement of a lever. More particularly, the invention relates to a remote control lever module for sensing the angular position of a pedal lever for an electronic vehicle control system.

BACKGROUND

Vehicle control systems are known having a sensor, such as a potentiometer, connected to an accelerator pedal for measuring the displacement of the accelerator pedal.

Such apparatus includes a shaft rotated by the accelerator pedal. The shaft is coupled to a position sensor which measures the rotation of the shaft, and has a dual coil return spring. The shaft also includes a disk which rotates therewith. The disk fits between pads which are fixed to a housing within which the shaft rotates. When the shaft rotates, the pads exert a frictional force on the disk to create a desired hysteresis effect.

SUMMARY OF THE INVENTION

The present invention provides an improved remote control lever module for sensing the angular position of a lever. Such remote control lever modules are particularly suited for use in electronic vehicle control systems for sensing the angular position of a pedal lever.

The lever module includes a friction pad disposed between a shaft and a support. The friction pad has a first friction surface engaging the shaft to frictionally resist relative displacement between the friction pad and shaft. The friction pad has a second friction surface engaging the support to frictionally resist relative displacement between the friction pad and support. The frictional resistance provided by the first and second friction surfaces provides a desired hysteresis effect. Also, the first and second friction surfaces can each separately permit relative rotation between the shaft and support, independently of the other friction surface.

The lever module also may have a ball bearing assembly surrounding the shaft in the support. The bearing assembly is press fit into the support and loosely fit about the shaft. This construction assures that the shaft may rotate in the support.

These and other features and advantages of the invention will be more fully understood from the following description of certain specific embodiments of the invention taken together with the accompanying drawings.

BRIEF DESCRIPTION OF THE DRAWINGS

In the drawings.

Corresponding reference characters indicate corresponding parts throughout the several views of the drawings.

DETAILED DESCRIPTION

Figure 1:
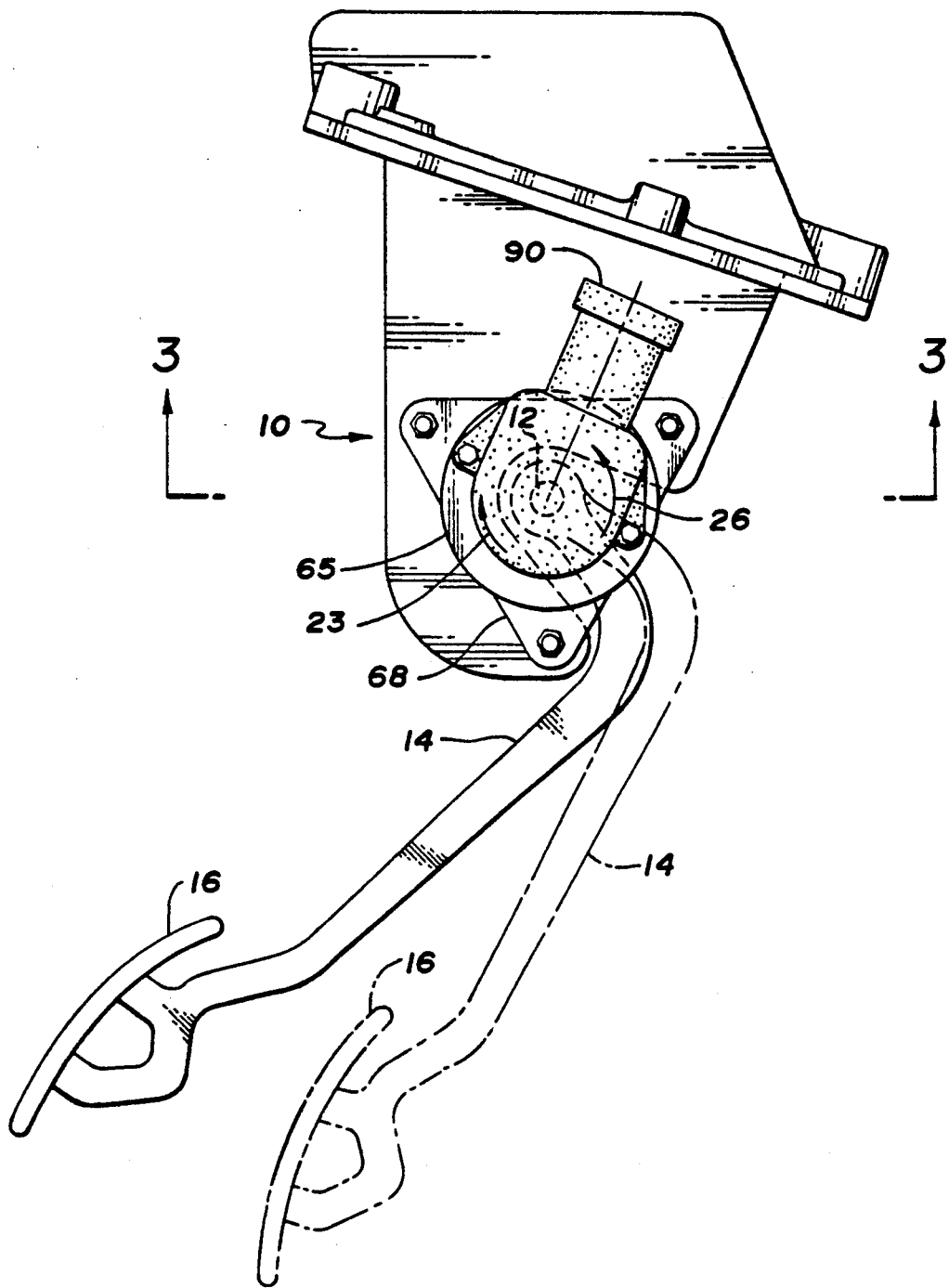
FIG. 1 is a side elevational view of one embodiment of the remote control lever module connected to a pedal and vehicle.
Figure 2:
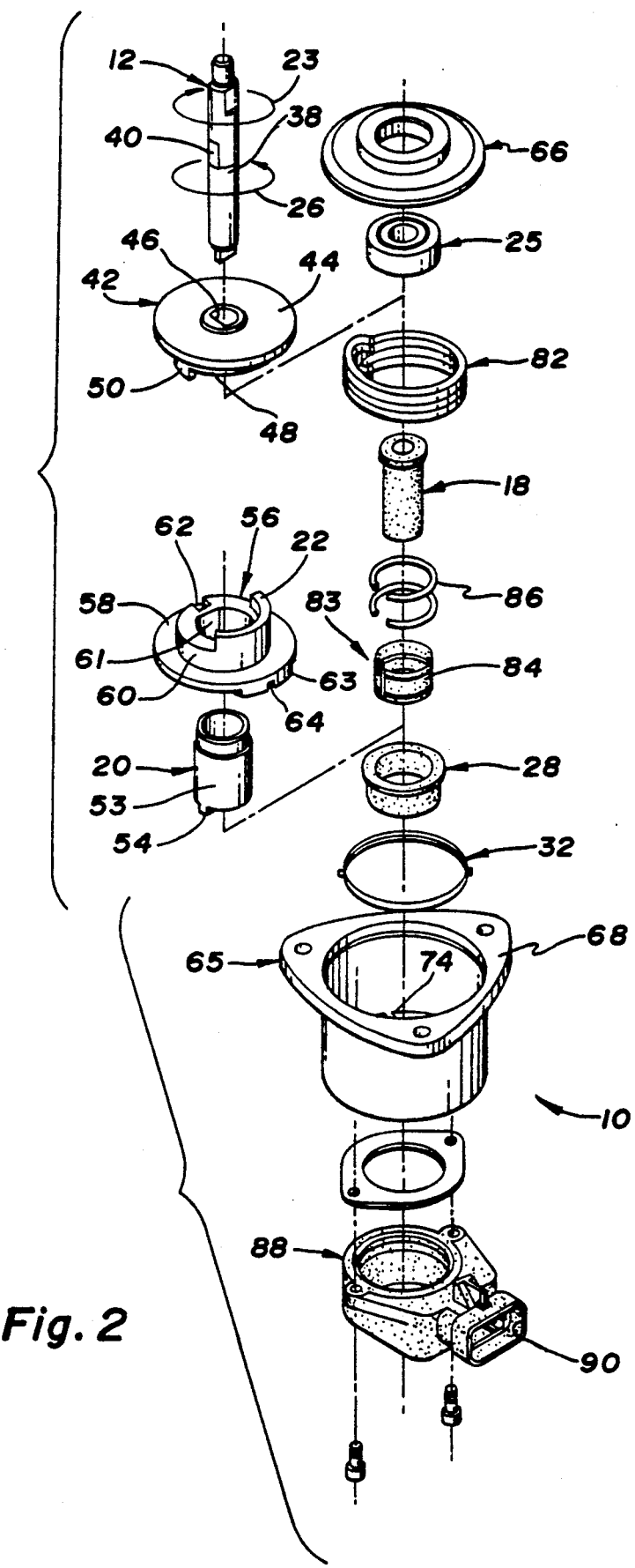
FIG. 2 is an exploded view of the FIG. 1 remote control lever module.

Referring to FIGS. 1-6, numeral 10 generally indicates a remote control lever module of the present invention. The lever module 10 comprises a lever including an inner shaft 12, and an actuating arm 14 extending from the inner shaft at an angle thereto. A pedal 16 is connected to the actuating arm 14.

An intermediate bearing 18 coaxially surrounds a portion of the inner shaft 12. An outer shaft 20 coaxially surrounds a portion of the intermediate bearing 18 enabling relative rotation between the inner and outer shafts 12, 20. The outer shaft 20 has an outer shaft stop 22 engageable with the inner shaft 12 to limit backward rotation, indicated by numeral 23, of the inner shaft 12 with respect to the outer shaft when the inner shaft engages the outer shaft stop thereby defining a rearmost position.

A support means 24 includes an inner shaft bearing 25 surrounding the inner shaft 12. Displacement of the actuating arm 14 causes the inner shaft 12 to rotate in a forward direction, indicated by numeral 26, or in a backward direction 23 about its axis. Displacement of the actuating arm 14 can be produced by the operator depressing the pedal 16 or releasing a depressed pedal. An outer shaft bearing 28 pivotally supports the outer shaft 20 enabling the outer shaft to forwardly or backwardly rotate about its axis.

A return means 30 engages the inner and outer shafts 12, 20 enabling forward rotation 26 of the inner shaft to cause forward rotation of the outer shaft. The return means 30 also urges the inner shaft 12 toward the rearmost position when the inner shaft has forwardly rotated away from the rearmost position.

The return means 30 limits backward rotation 23 of the outer shaft 20 beyond a nonactuating position, with the engagement between the inner shaft 12 and outer shaft stop 22 limiting backward rotation 23 of the inner shaft beyond the nonactuating position.

A force spring 32 has one end anchored to the outer shaft 20 and another end anchored to the support means 24. The force spring 32 urges the outer shaft 20 toward the nonactuating position when the outer shaft has forwardly rotated away from the nonactuating position. The force spring 32 is sufficiently yielding so that rotation of the inner shaft 12 causes rotation of the outer shaft 20.

An inner shaft sensor 34 is connected to the support means 24 and is adapted to produce an electrical signal proportional to the angular displacement of the inner shaft 12 with respect to the support means. An outer shaft sensor 36 is connected to the support means 24 and is adapted to produce an electrical signal proportional to the angular displacement of the outer shaft 20 with respect to the support means.

The inner shaft 12 includes a cylindrical inner shaft axle 38 with one end having a double D configuration in cross section for attachment of the actuating arm 14 thereto. The one end of the inner shaft axle 38 may also have screw threads. The other end of the inner shaft axle 38 also has a double D configuration in cross section for engagement with the inner shaft sensor 34. The inner shaft axle 38 has a flat 40 on its outer surface.

The inner shaft 12 includes an inner shaft collar 42 having an annular flange portion 44 press fitted to the inner shaft axle 38. The inner shaft collar 42 has a flat 46 on its inner surface which engages the flat 40 on the inner shaft axle 38 so that the inner shaft axle and inner shaft collar have a predetermined angular alignment with respect to one another. The inner shaft collar 42 has a cylindrical spacer portion 48 extending from the flange portion 44. The inner shaft collar 42 has an inner shaft stop 50 comprising an arcuate inner tab extending from the spacer portion 48. The inner shaft stop 50 defines a 180 degree arc. A longitudinal slot 51 extends through the inner shaft stop 50 and spacer portion 48. The longitudinal slot 51 is located midway between the ends of the inner shaft stop 50. The inner shaft collar 42 also has a cylindrical axle portion 49 depending from the flange portion 44 and press fitted onto the inner shaft axle 38. The axle portion 49 has an annular cross section which is uniform along its length. The flange portion 44 and axle portion 49 may also be molded with the inner shaft axle 38 as a single integral unit.

The intermediate bearing 18 is cylindrical and can be formed from a variety of materials that reduce friction caused by sliding contact between two surfaces. One such material is a thermoset plastic comprising 43% graphite, 20% phenolic with the remaining 37% comprising illite, talc, zincite and carbon.

The outer shaft 20 includes a cylindrical outer shaft axle 53 with a hollow interior to fit over the intermediate bearing 18. The outer shaft axle 53 has a flat 52 on its outer surface. One end of the outer shaft axle 53 has diametrically opposed longitudinal prongs 54 extending therefrom for engagement with outer shaft sensor 36.

The outer shaft 20 includes an outer shaft collar 56 having an annular flange portion 58 press fitted thereto. The inner surface of the outer shaft collar 56 has a flat 61 which the flat 52 on the outer shaft axle 53 engages so that the outer shaft axle and outer shaft collar have a predetermined angular alignment with respect to one another. The outer shaft collar 56 has a cylindrical spacer portion 60 extending upward from the flange portion 58. The spacer portion 60 is also press fitted to the outer shaft axle 53. The flange portion 58 and spacer portion 60 may also be molded with the outer shaft axle 53 as a single integral unit.

The outer shaft stop 22 comprises an arcuate tab portion extending upward from the spacer portion 60 of the outer shaft collar 56. The outer shaft stop 22 defines a 154 degree arc. A longitudinal slot 62 is located 80 degrees from one end of the outer shaft stop 22 in the spacer portion 60.

The outer and inner shaft stops 22, 50 mesh together so that they are contained in the same radial plane with respect to the inner and outer shaft axles 38, 53. Since the total arc length of the outer and inner shaft stops 22, 50 is 334 degrees, there is 26 degrees of rotation between the inner and outer shafts 12, 20. The maximum backward rotation 23 of the inner shaft 12, with respect to the outer shaft 20, is limited by the engagement of one end of the outer shaft stop 22 with one end of the inner shaft stop 50 and defines the rearmost position. The maximum forward rotation 26 of the inner shaft 12, with respect to the outer shaft 20, is limited by the engagement of the other end of the outer shaft stop 22 with the other end of the inner shaft stop 50 and defines the foremost position.

The return means 30 includes a return stop 63 comprising an arcuate tab portion depending from the flange portion 58 in the opposite direction from the spacer portion 60. The return stop 63 defines a 60 degree arc and is spaced 33.25 degrees from one end of the outer shaft stop 22. A longitudinal slot 64 is located midway between the ends of the return stop 63.

The support means 24 comprises a metallic support housing 65 having a cylindrical interior with circular openings at each end. A cover 66 is disposed over one end of the support housing 65 with the support housing being crimped over the cover to prevent removal of the cover therefrom. The support housing 65 has a support flange 68 parallel to the plane of the cover 66. The support flange 68 has three mounting holes for mounting the support housing 65 to a vehicle so that the support housing is stationary with respect to the seat of the operator.

The inner and outer shaft axles 38, 53, and the inner and outer shaft collars 42, 56 are located in the support housing 65. The inner shaft bearing 25 is disposed between the inner shaft axle 38 and support housing 65, and comprises a ball bearing The outer shaft bearing 28 is cylindrical and disposed between the outer shaft axle 53 and support housing 65. The outer shaft bearing 28 can be formed from a variety of materials that reduce friction caused by sliding contact between two surfaces One such material is a thermoset plastic comprising 43% graphite, 20% phenolic with the remaining 37% comprising illite, talc, zincite and carbon.

The end of the support housing 65 adjacent the outer shaft bearing 28 has inner and outer annular bosses 70, 72 formed thereon The longitudinal dimension of the inner boss 70 is less than the outer boss 72. The outer boss 72 has a radial slot 74.

Figure 6:
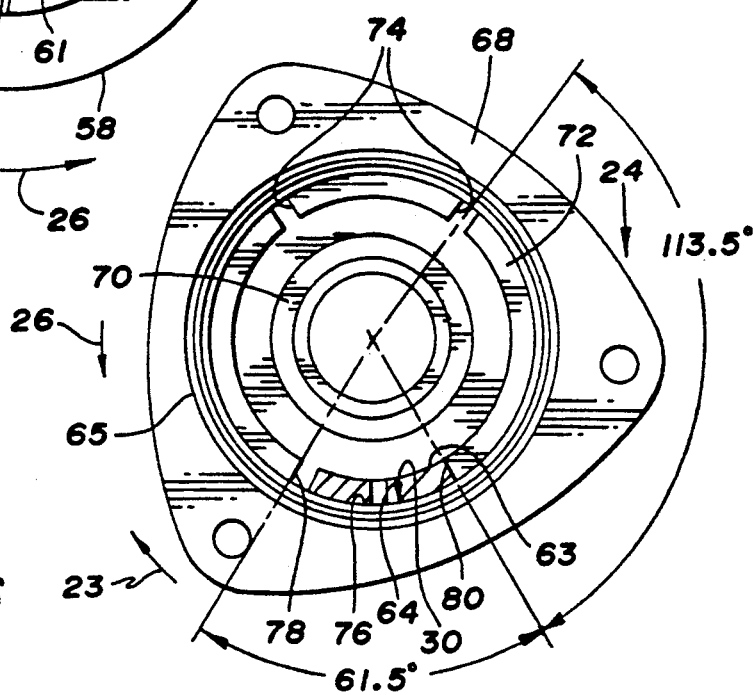
FIG. 6 is an end view of the lever module, generally indicated by the line 6—6 of FIG. 3, showing the support housing with the parts, other than the return stop, having been removed from it

The return means 30 comprises a return recess 76 formed in the outer boss 72. The return recess 76 has one end located 113.5 degrees from the radial slot 74, and defines a 61.5 degree arc, as shown in FIG. 6. The return stop 63 extends into the return recess 76 so that 1.5 degrees of rotation is allowed between the return stop and support housing 65.

Backward rotation 23 of the outer shaft 20, with respect to the support housing 65, is limited by engagement of the return stop 63 with the rear end of the return recess 76 which constitutes a rear stop 78. The nonactuating position is defined by the angular position of the outer shaft 20 when the return stop 63 engages the rear stop 78 of the return recess 76. Forward rotation 26 of the outer shaft 20, with respect to the support housing 65, is limited by engagement of the return stop 63 with the front end of the return recess 76 which constitutes the front stop 80. The actuating position is defined by the angular position of the outer shaft 20 when the return stop 63 engages the front stop 80 of the return recess 76.

The return means 30 further includes a return spring 82 which may comprise a double coil helical torsion spring. Each coil of the return spring 82 has a tang at one end which is inserted into the slot 51 in the inner shaft collar 42 to anchor the return spring to the inner shaft 12. The other end of each coil of the return spring 82 also has a tang which is inserted into the slot 62 in the outer shaft collar 56 to anchor the return spring to the outer shaft 20. The return spring 82 encircles the spacer portions 48, 60 when anchored to the inner and outer shaft collars 42, 56. The return spring 82 urges forward rotation 26 of the outer shaft 20 when the inner shaft 12 is forwardly rotated. The return spring 82 is sufficiently yielding so that, when the outer shaft 20 is in the actuating position, the return spring allows forward rotation 26 of the inner shaft 12 away from the rearmost position. The return spring 82 acts on the inner shaft 12 when it has forwardly rotated 26 away from the rearmost position to urge the inner shaft toward the rearmost position.

One end of the force spring 32 has a tang which is inserted into the slot 64 in the return stop 63 to anchor the force spring to the outer shaft 20. The other end of the force spring 32 has a tang which is inserted into the slot 74 in the outer boss 74 to anchor the force spring to the support housing 65. The force spring 32 is disposed between the inner and outer bosses 70, 72 when anchored to the outer shaft 20 and support housing 65. The stiffness of the force spring 32 is substantially less than the stiffness of the return spring 82.

It is possible to reverse the orientation of the slots 51, 62, 64, 74 so that the direction of forward and backward rotation 26, 23 of the inner and outer shafts 12, 20 with respect to the support housing 65 is reversed. The support housing 65 has a second slot 74 in which the tang at the other end of the force spring 32 is inserted to facilitate such reversal.

The axle portion 49 of the inner shaft collar 42, and the outer shaft axle 53 are coaxially positioned end-to-end. A friction collar 83 includes a sleeve 84 formed of thermoplastic comprising an ETFE (ethylene tetrafluoroethylene) fluoropolymer with 10% glass. The sleeve 84 has a first friction surface which coaxially surrounds and engages the end of the outer shaft axle 53 adjacent to the axle portion 49. The sleeve 84 has a second friction surface which coaxially surrounds and engages the end of the axle portion 49 adjacent to the outer shaft axle 53.

Resilient collar rings 86 fit in grooves in the sleeve 84 to coaxially surround the sleeve. The collar rings 86 radially compress the sleeve 84 to cause the sleeve to grip the axle portion 49 and outer shaft axle 53. This results in the first friction surface frictionally resisting relative displacement between the sleeve 84 and outer shaft axle 53, and the second friction surface frictionally resisting relative displacement between the sleeve 84 and axle portion 49. The sleeve 84 thereby frictionally resists relative rotation between the inner and outer shafts 12, 20.

A sensor housing 88 contains the inner and outer shaft sensors 34, 36. The sensor housing 88 is bolted to the end of the support housing 65 opposite the cover 66 so that the ends of the inner and outer shaft axles 38, 53 extend out of the support housing into the sensor housing to engage the inner and outer shaft sensors 34, 36.

The outer shaft sensor 36 includes an annular member with diametrically opposed slots into which the prongs on the outer shaft axle 53 are inserted. Rotation of the outer shaft 20 causes the prongs 54 to engage the slots and cause the annular member to concomitantly rotate. The outer shaft sensor 36 includes an outer shaft sensor element which is connected to the annular member and thereby concomitantly rotates with the outer shaft 20. The outer shaft sensor element produces an electrical force signal proportional to the rotation of the annular member (which equals the rotation of the outer shaft 20) with respect to the support housing 65. The signal produced when the outer shaft 20 is in the nonactuating position constitutes the nonactuating signal, and the signal produced when the outer shaft is forwardly rotated 26 away from the nonactuating position constitutes the actuating signal. The signal produced by the outer shaft sensor 36 preferably has an inversed polarity wherein its voltage decreases as the outer shaft forwardly rotates.

Figure 7:
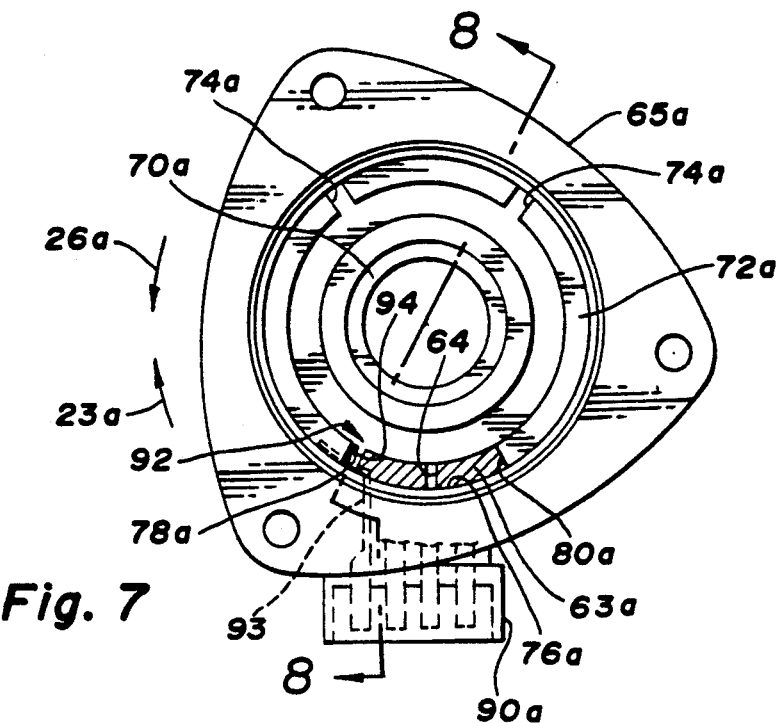
FIG. 7 is a view corresponding to FIG. 6 showing a second embodiment.
Figure 8:
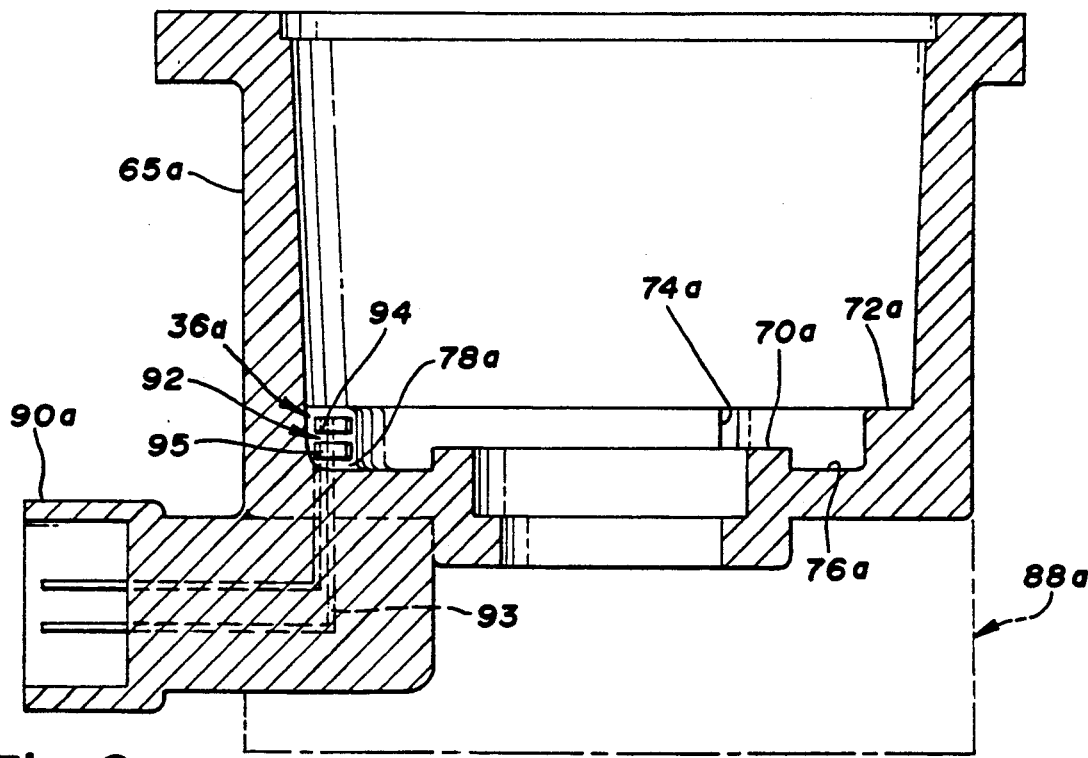
FIG. 8 is an axial sectional view indicated by the line 8—8 of FIG. 7.
Figure 9:
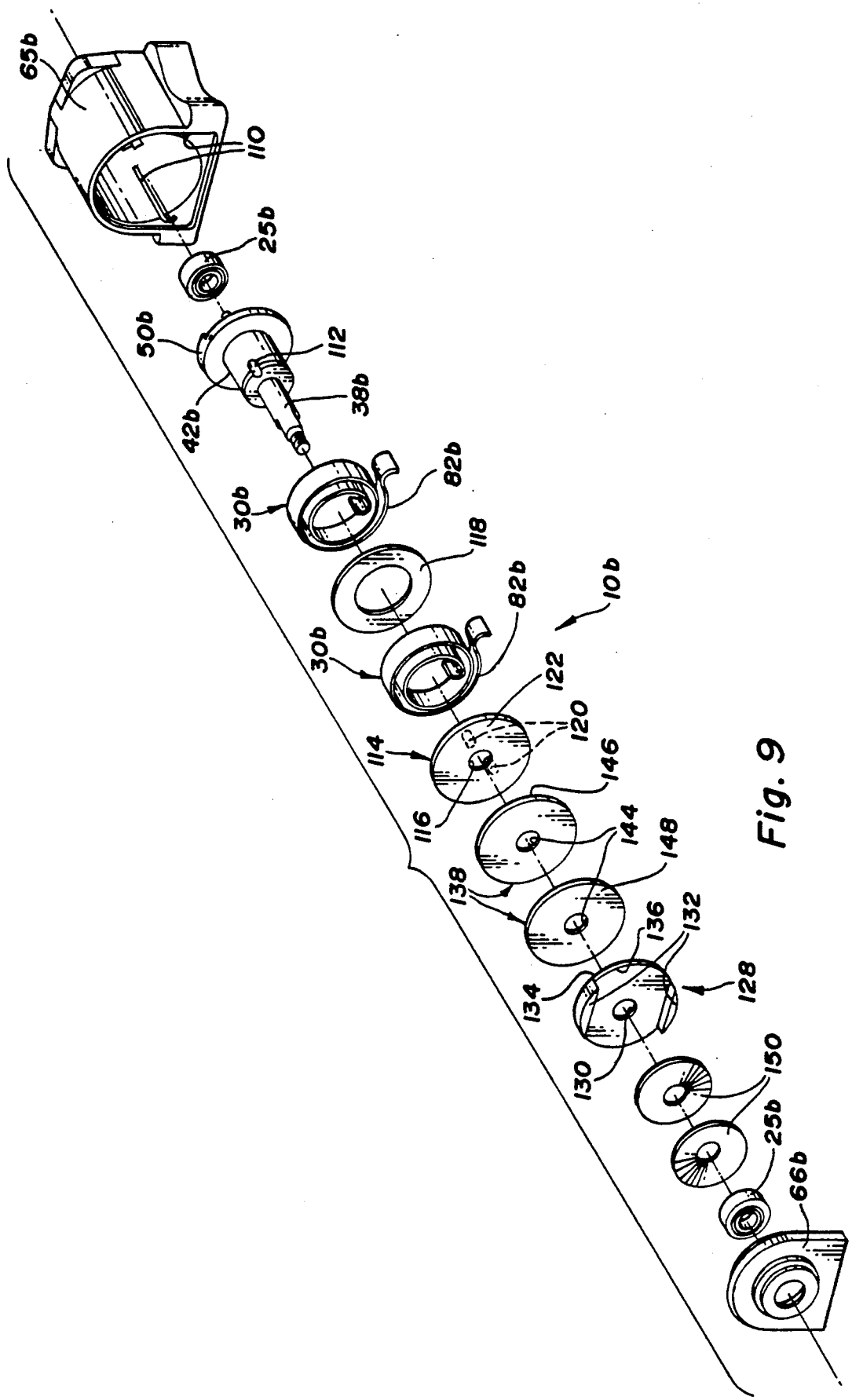
FIG. 9 is an exploded view of another embodiment of the lever module.

As shown in FIGS. 7 and 8, the outer shaft sensor 36a may alternatively comprise a switch 92 mounted on the rear stop 78a. Parts similar to those shown in FIGS. 1-6 have the same reference numeral with the addition of the suffix a. In this embodiment, the support housing 65a and sensor housing 88a are constituted by a single integral piece. The switch 92 comprises first and second electrical contacts 94, 95 comprising resilient conductive precision stampings which extend away from the rear stop 78a. The first and second electrical contacts 94, 95 are insert molded into the rear stop 78a. The first and second contacts 94, 95 are preferably formed from beryllium-copper and may be alternatively formed from phosphor-bronze. Switch leads 93 extend from the first and second contacts 94, 95 through the support housing 65a and into the sensor housing 88a. The plastic material of which the support housing 65a and sensor housing 88a is formed results in the first and second contacts 94, 95 and switch leads 93 being electrically isolated from one another.

The first contact 94 is resilient and extends further away from the rear stop 78a than the second contact 95 so that when the outer shaft 20a backwardly rotates toward the rear stop 78a, the return stop 63a initially engages the first contact causing it to deflect. The first contact 94 is sufficiently stiff to considerably reduce the angular velocity of the return stop 63a thereby reducing the impact force of the return stop against the second contact 95. This can result in the first contact 94 being stiffer than the second contact 95.

The resiliency of the first contact 94 enables the outer shaft 20a to backwardly rotate further into engagement with the second contact 95 so that the return stop 63a engages the first and second contacts 94, 95 when the outer shaft is in the nonactuating position. Thus, the switch 92 is sandwiched between the rear stop 78a and the return stop 63a when the outer shaft 20a is in the nonactuating position.

The portion of the return stop 63a which engages the first and second contacts 94, 95 is electrically conductive so that contact between them enables an electrical current to flow between the first and second contacts via the return stop to produce the nonactuating signal. Thus, the sandwiching results in the switch 92 producing the nonactuating signal.

The electrical current flow is interrupted when the outer shaft 20a is in the actuating position wherein the return stop 63a is disengaged from the first and second contacts 94, 95. This causes the switch 92 to produce the actuating signal.

Figure 3:
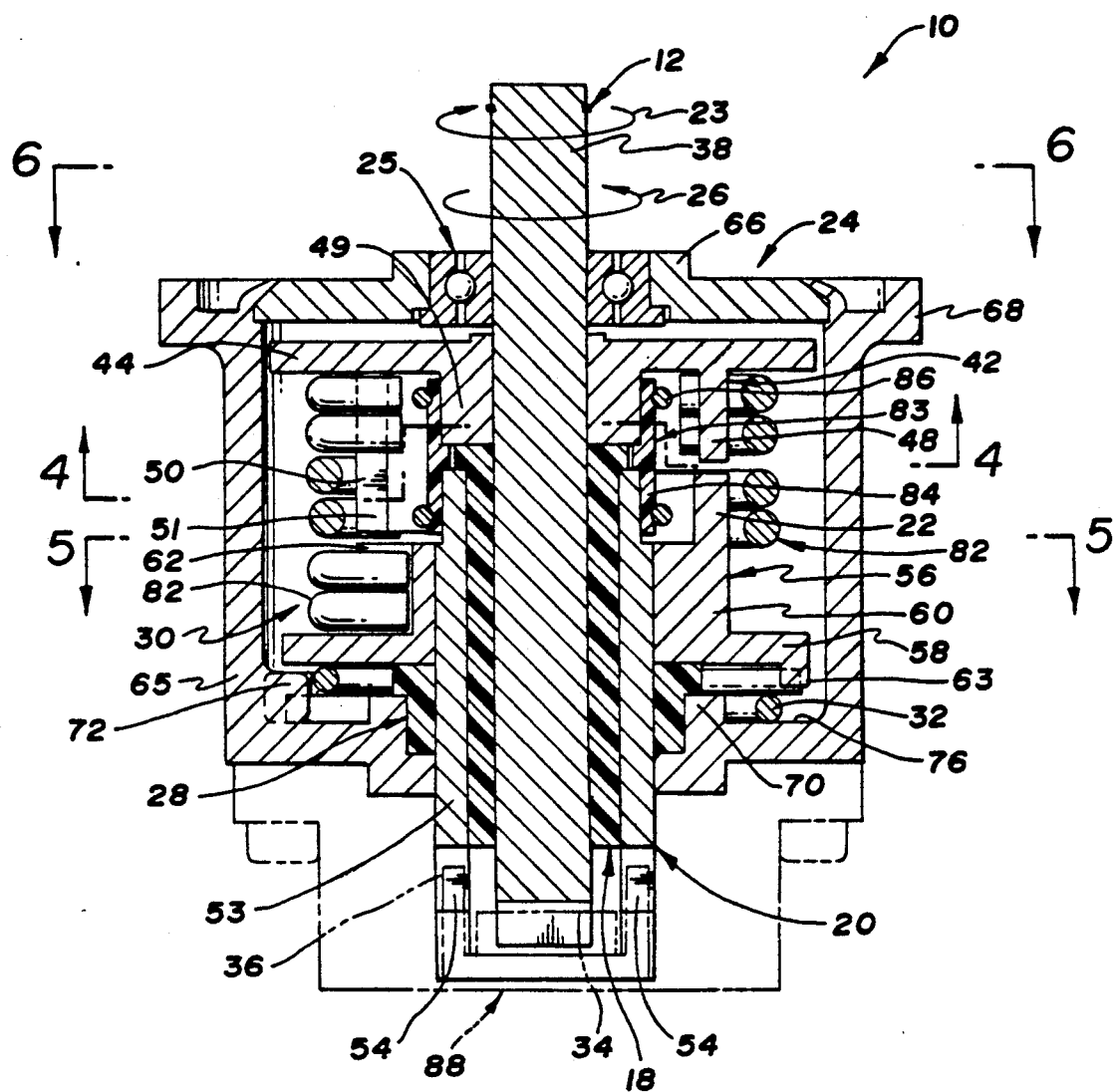
FIG. 3 is an enlarged axial sectional view of the lever module indicated by line 3—3 of FIG. 1.
Figure 4:
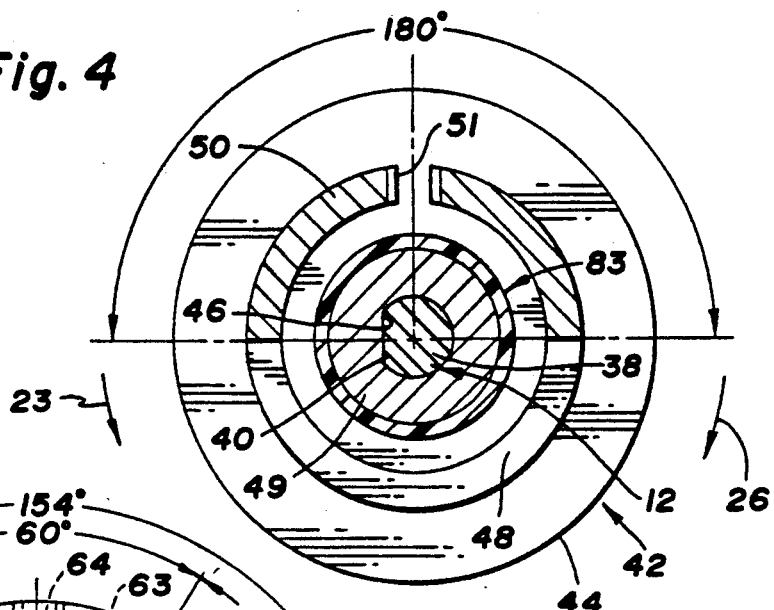
FIG. 4 is a cross sectional view of the lever module indicated by the line 4—4 of FIG. 3.
Figure 5:
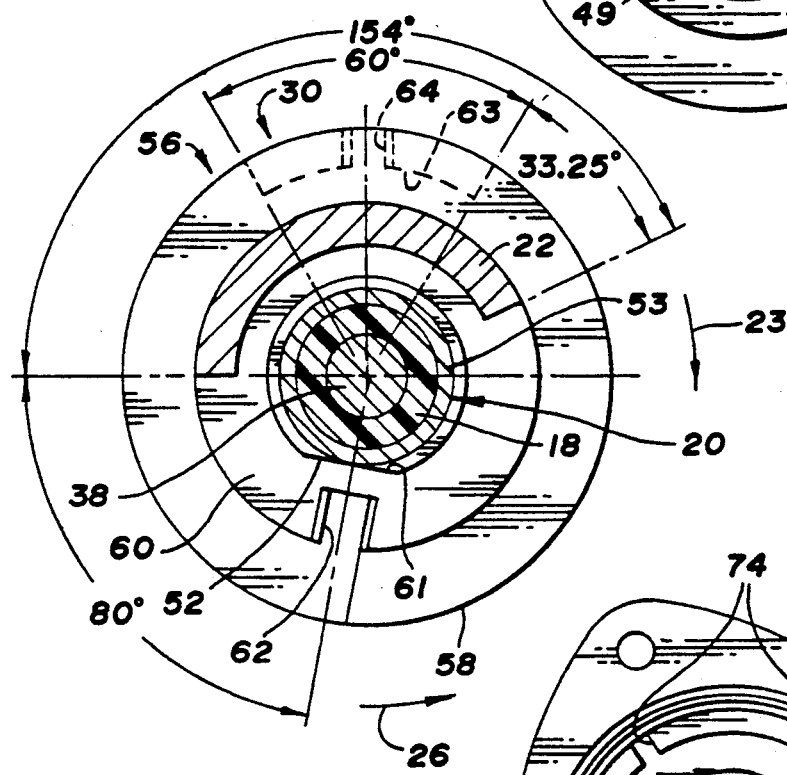
FIG. 5 is a cross sectional view of the lever module indicated by the line 5—5 of FIG. 3.

It is also possible for the outer shaft sensor 36 to comprise an annular member which concomitantly rotates with the outer shaft axle 53, as shown in FIG. 3, and a switch 92, as shown in FIGS. 7 and 8.

The inner shaft sensor 34 includes a cylindrical member concentric with the annular member of the outer shaft sensor 36 and longitudinally spaced apart from the support housing 65. The cylindrical member has radial detents which extend radially inward from its inner wall. The end of the inner shaft axle 38 extends into the cylindrical member between the radial detents so that rotation of the inner shaft causes the end of the inner shaft axle to engage the detents and produce concomitant rotation of the cylindrical member. A spring is connected to the cylindrical member to resist forward rotation 26 of the cylindrical member thereby causing the cylindrical member to backwardly rotate concomitantly with the inner shaft axle 38.

The inner shaft sensor 34 preferably includes three inner shaft resistive sensor elements which are connected to the cylindrical member and concomitantly rotate with the inner shaft 12. Each inner shaft sensor element produces an output voltage proportional to the rotation of the inner shaft 12 with respect to the support housing 65. Two of the inner shaft sensor elements have opposite polarities so that when rotation of the inner shaft 12 causes the output voltage of one inner shaft sensor element to increase, the output voltage of the other inner shaft sensor element decreases by an equal amount. The third inner shaft sensor element has a negative polarity wherein its voltage output decreases as the inner shaft 12 forwardly rotates. When the inner shaft 12 is in the nonactuating position, the voltage output of the third inner shaft sensor element equals the voltage output of the other inner shaft sensor element having a negative polarity. When the inner shaft 12 rotates, however, the change in voltage output of the other inner shaft sensor element having a negative polarity is twice the voltage output change of the third inner shaft sensor element. The output voltages of the inner shaft sensor elements constitute the electrical position signal.

The sensor housing 88 has a connector socket 90 adapted to receive a connector which is electrically connected to an electronic control system.

In operation, when the operator depresses the pedal 16, the inner shaft 12 forwardly rotates. The forward rotation 26 of the inner shaft 12 is transmitted to the outer shaft 20 via the return spring 82. The outer shaft 20 forwardly rotates away from the nonactuating position causing the return stop 63 to disengage from the rear stop 78 of the return recess 76. After the outer shaft 20 has rotated 1.5 degrees, the return stop 63 engages the front stop 80 of the return recess 76 which obstructs further forward rotation 26 of the outer shaft 20 with the outer shaft being in the actuating position. During the forward rotation 26 of the outer shaft 20, the inner shaft 12 rotates very little with respect to the outer shaft 20 since the return spring 82 is substantially stiffer than the force spring 32.

Continued rotation of the inner shaft 12 by depression of the pedal 16 causes the inner shaft to forwardly rotate away from the rearmost position with the inner shaft stop 50 disengaging from the outer shaft stop 22. The friction collar 83 resists relative rotation of the inner shaft 12 with respect to the outer shaft 20.

The inner and outer shaft sensors 34, 36 measure the angular displacement of the inner and outer shafts, 12, 20, respectively, and the electronic control system controls the vehicle in accordance therewith.

When depression of the pedal 16 ceases, the return spring 82 urges the inner shaft collar 42 to backwardly rotate with respect to the outer shaft 20, toward the rearmost position. When the inner shaft 12 reaches the rearmost position, the inner shaft stop 50 engages the outer shaft stop 22. The force spring 32 then urges the outer shaft collar 56 to backwardly rotate from the actuating to nonactuating positions, and the return spring 82 causes the backward rotation 23 of the outer shaft 20 to be transmitted to the inner shaft 12.

Deviations from the above sequence are sensed by the inner and outer shaft sensors 34, 36 and detected by the electronic control system. Deviations can indicate that an examination of the lever module 10 is warranted.

The electronic control system is also able to detect inconsistencies between the output voltages produced by the inner shaft sensor elements of the inner shaft sensor 34. The opposite polarities of the inner shaft sensor elements, and the different rates at which the output voltages change, facilitate detection of some inconsistencies.

The electronic control system is further able to detect inconsistencies between the actuating/nonactuating signals produced by an outer shaft sensor 36.

FIGS. 9-13 show an alternative embodiment 10b of the lever module. Parts similar to those shown in FIGS. 1-8 have the same reference numeral with the addition of the suffix b. In this embodiment, shaft bearings 25b comprising sealed ball bearings surround the shaft at opposite ends of the support housing 65b. The outer race of the upper shaft bearing 25b is held in the cover 66b by a press fit. The outer race of the lower shaft bearing 25b is held in the support housing 65b by a press fit. The inner diameters of the inner races of both shaft bearings 25b are larger than the cross sections of the respective portions of the shaft axle 38b which extend through them. Each shaft bearing 25b has a pair of annular rubber members which extend between the inner and outer races with one rubber member being above and the other rubber member being below the balls in the bearing.

The shaft 12b includes a stainless steel shaft axle 38b and a die cast aluminum shaft collar 42b. The shaft collar 42b is preferably insert molded around the shaft axle 38b, with the two parts being machined as a single assembly. The shaft collar 42b can alternatively be held to the shaft axle by a press fit. The shaft collar 42b has an annular flange portion 44b and a cylindrical axle portion 49b extending therefrom. The shaft collar 42b has a shaft stop 50b comprising an arcuate inner tab extending from the flange portion 44b. The shaft stop 50b defines a 152.5 degree arc. A longitudinal slot 51b extends through the shaft stop 50b and spacer portion 48b.

Figure 13:
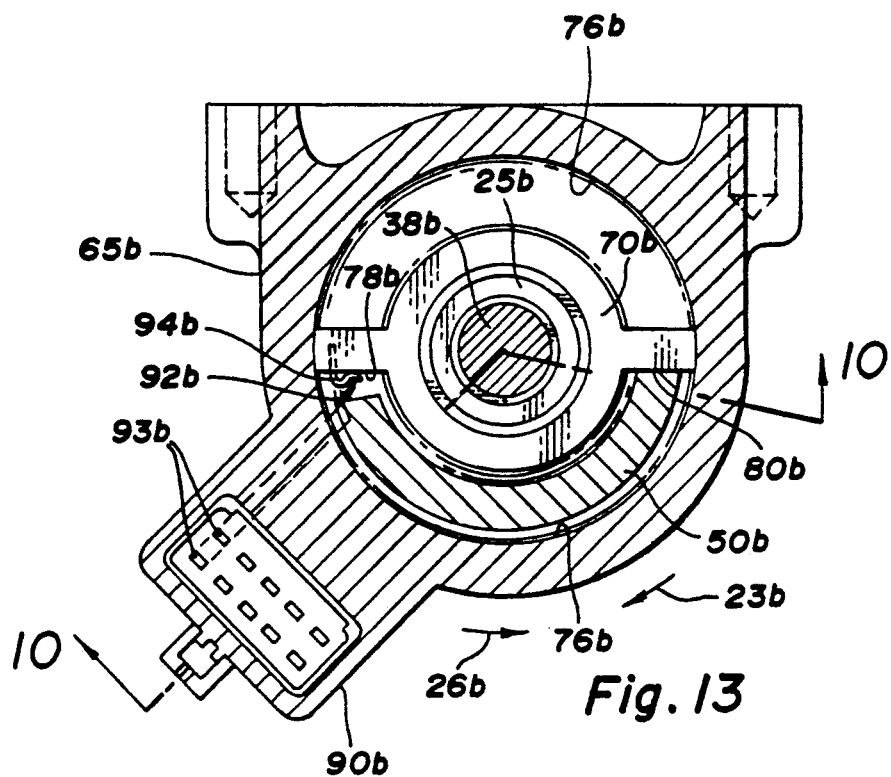
FIG. 13 is a cross sectional view indicated by the line 13—13 of FIG. 10.

The return means 30b comprises a pair of arcuate return recesses 76b formed in the end of the support housing 65b adjacent to the sensor housing 88b, as shown in FIG. 13. Each return recess 76b defines a 180 degree arc. The shaft stop 50b extends into one of the return recesses 76b so that 27.5 degrees of rotation is allowed between the shaft stop and support housing 65b.

Backward rotation of the shaft 12b, with respect to the support housing 65b, is limited by engagement of the shaft stop 50b with the rear end of the one return recess 76b which constitutes the rear stop 78b. The rearmost position is defined by the angular position of the shaft 12b when the shaft stop 50b engages the rear stop 78b of the return recess 76b. Forward rotation of the shaft 12b, with respect to the support housing 65b, is limited by engagement of the shaft stop 50b with the front end of the one return recess 76b which constitutes the front stop 80b. The actuating position is defined by the angular position of the shaft 12b when the shaft stop 50b is rotated away from the rear stop 78b.

The return means 30b includes a return spring 82b comprising a pair of spirally wound flat metal strip springs. Each coil of the return spring 82b has an inner tang at one end which is inserted into the slot 51b in the shaft collar 42b to anchor the return spring to the shaft 12b. The return spring 82b encircles the shaft collar 42b when anchored to it. The other end of each coil of the return spring 82b has an outer tang which is inserted into a housing slot 110 in the support housing 65b to anchor the return spring thereto. The return means 30b includes a plastic or metal spring washer 118 disposed between the strip springs of the return spring 82b. The spring washer 118 has an axial opening which is larger than the portion of the shaft collar 42b which extends through it. The return spring 82b acts on the shaft 12b when it has forwardly rotated away from the rearmost position to urge the shaft toward the rearmost position. The support housing 65b has a second housing slot 110 in which the outer tang of the return spring 82b can be inserted enabling reversal of the directions of forward and backward rotation 26b, 23b with respect to the support housing.

Figure 12:
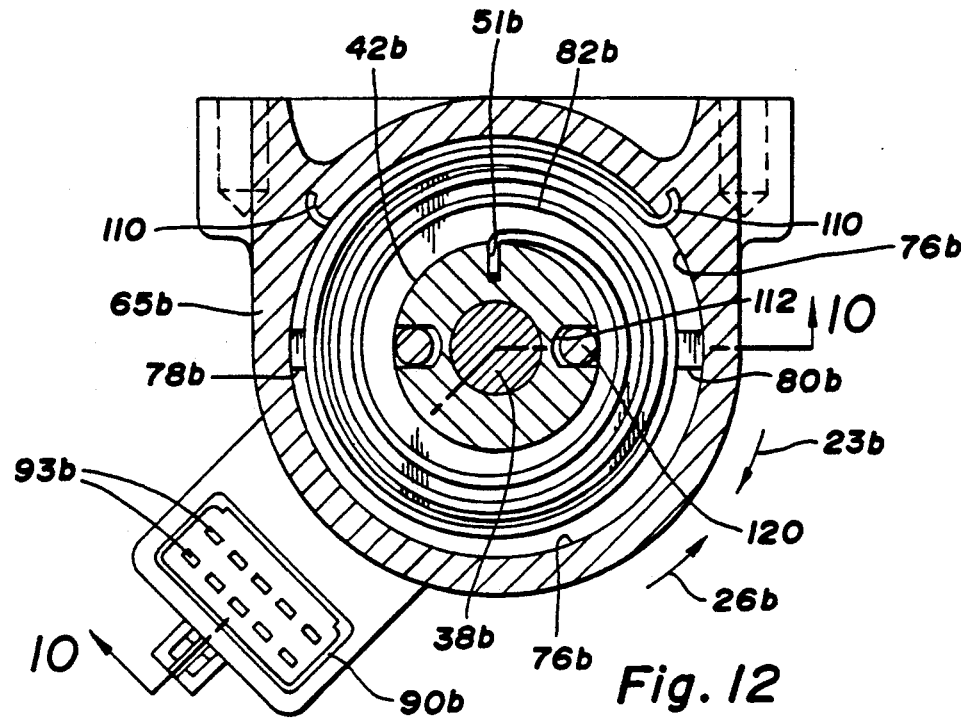
FIG. 12 is a cross sectional view indicated by the line 12—12 of FIG. 10.

The end of the shaft collar 42b opposite to the sensor housing 88b has a pair of cylindrical collar keyways 112 with each collar keyway having an axis which is parallel to the shaft axle 38b, as shown in FIG. 12.

The shaft 12b includes a shaft retainer 114 comprising a disk which frictionally engages an adjoining surface. Possible materials for the disk of the shaft retainer 114 has metal, plastic including phenolic and glass filled plastic, or materials similar to those used for conventional brake pads or clutch liners. The material of which the disk of the shaft retainer 114 is formed should have dimensional stability (i.e., be formable in accordance with precise specifications), high compressive strength, high coefficient of friction, and the ability to withstand high temperatures. Possible materials for the shaft retainer 114 include engineering plastics such as the polycarbonate material known by the trademark LEXAN 121 and the styrenemodified poly (phenylene oxide) resin known by the trademark NORYL 731 with 0%, 20% and 30% glass-fillings, powder metallurgy parts with or without EDM patterns, and coated metal parts.

Figure 10:
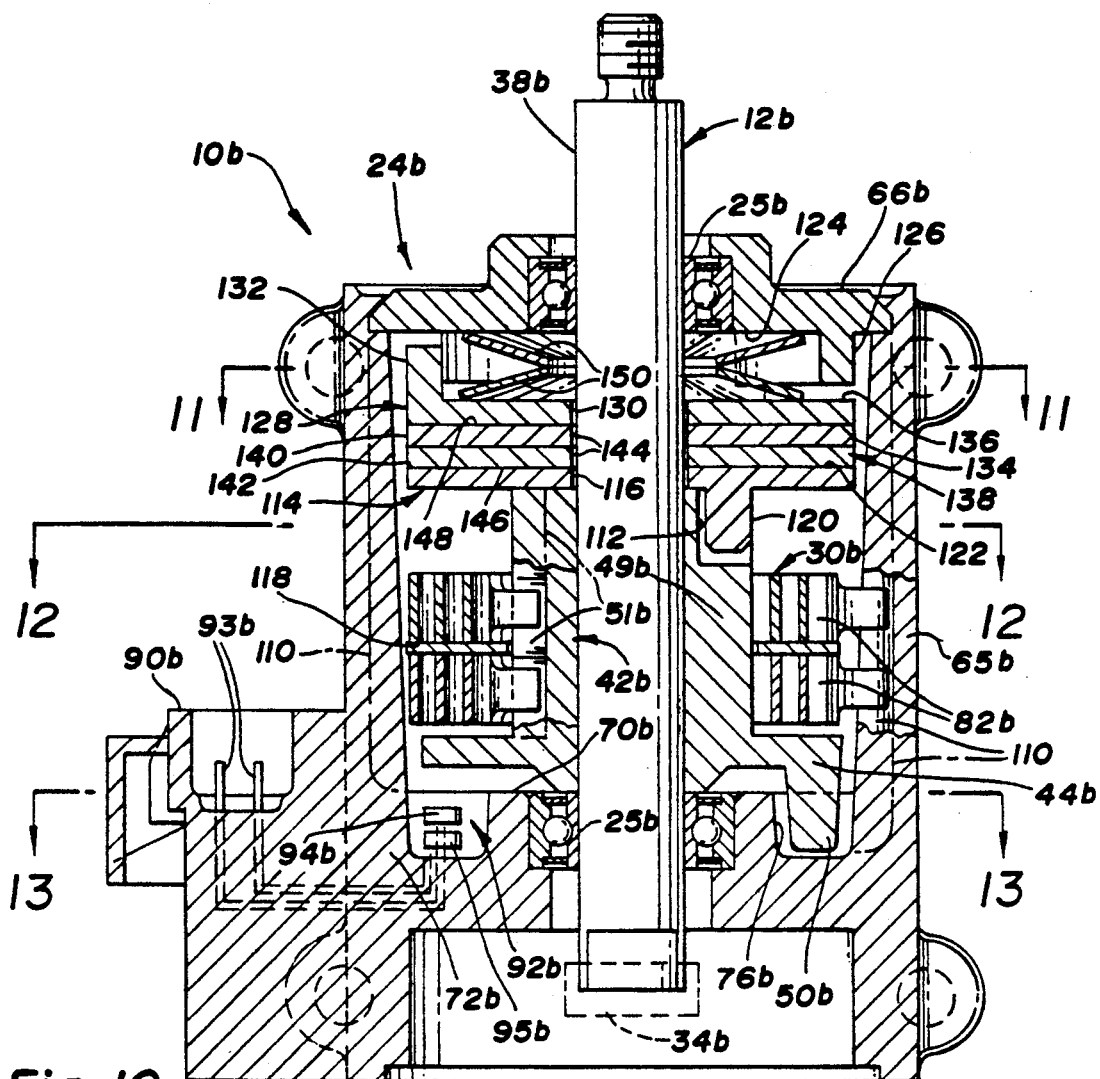
FIG. 10 is an axial sectional view of the FIG. 9 embodiment, as indicated by the lines 10—10 of FIGS. 11-13, with parts having been broken away to show the inner and outer tangs of the return spring 82b.

The shaft retainer 114 has an axial opening 116 through which the shaft axle 38b extends. The axial opening 116 has a cross section which is larger than the cross section of the portion of the shaft axle 38b which extends through it. The shaft retainer 114 has a pair of downwardly extending collar pins 120 which extend into the collar keyways 112 to key the shaft retainer to the shaft collar 42b, as shown in FIGS. 10 and 12. The collar pins 120 are held in the collar keyways 112 by a press fit. Relative rotation between the shaft retainer 114 and shaft collar 42b is thereby obstructed. The shaft retainer 114 has a first retainer surface 122 opposite the collar pins 120 in a plane perpendicular to the axis of the shaft axle 38b.

The plastic cover 66b is staked to the one-piece plastic support housing 65b by vibration or sonic welding. The cover 66b includes an interior end surface 124 which has a pair of arcuate cover flanges 126 which extend inwardly along the axis of the shaft axle 38b, as shown in FIGS. 10 and 11.

The support means 24b includes a support member 128 comprising a disk formed of a material included in the group of possible materials described above for the disk of the shaft retainer 114. The support member 128 has an axial opening 130 through which the shaft axle 38b extends. The axial opening 130 has a cross section which is larger than the cross section of the portion of the shaft axle 38b which extends through it.

Figure 11:
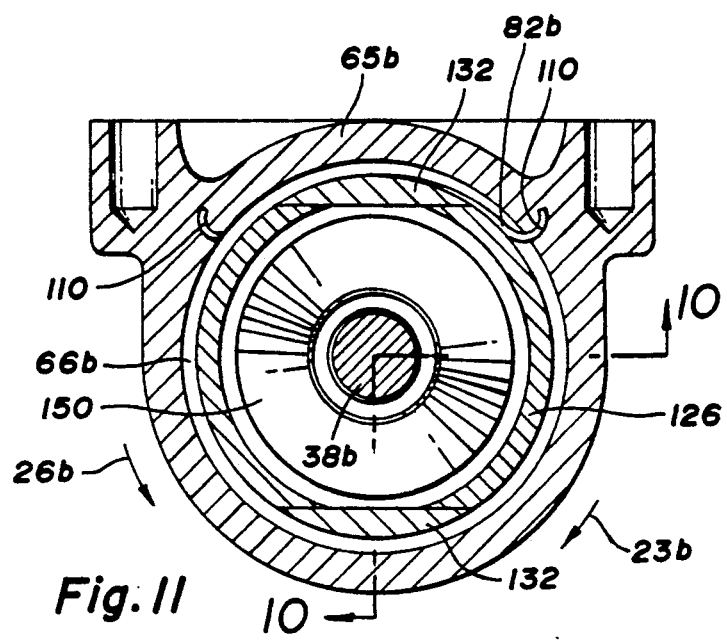
FIG. 11 is a cross sectional view indicated by the line 11—11 of FIG. 10.

The support member 128 has a pair of upwardly extending support pins 132 which extend into the spaces between the cover flanges 126, as shown in FIGS. 10 and 11. The cross section of each support pin 132 corresponds to space between the cover flanges 126 to key the support member 128 to the cover 66b. Relative rotation between the support member and cover 66b is thereby obstructed. Axial displacement of the support member 128 with respect to the cover 66b is allowed.

The support member 128 has a second retainer surface 134 which faces the first retainer surface 122 in a plane parallel thereto. The support member 128 has a spring surface 136 which faces the end surface 124 in a plane parallel thereto.

A friction pad 138 comprising upper and lower pads 140, 142 is disposed between the shaft retainer 114 and support member 128. The upper and lower pads 140, 142 are formed of a material included in the group of possible materials described above for the disk of the shaft retainer 114. The material of the upper pad 140 differs from the material of the second retainer surface 134 and the material of the lower pad 142, and the material of the lower pad 142 differs from the material of the first retainer surface 122. This arrangement, wherein different materials adjoin one another, may be achieved by forming the support member 128 and lower pad 142 of the same material, and the upper pad 140 and shaft retainer 114 of the same material, wherein the material of the upper pad 140 differs from the material of the lower pad 142. The materials of the upper and lower pads 140, 142, and the first and second retainer surfaces 122, 134 can be selected so that relative displacement between predetermined pairs of adjoining surfaces occurs when predetermined torques are applied to the shaft 12b, with the torque being proportional to the force applied to the pedal.

The friction pad 138 has an axial opening 144 through which the shaft axle 38b extends. The axial opening 144 has a cross section which is larger than the cross section of the portion of the shaft axle 38b which extends through it. The friction pad 138 has a first friction surface 146 which engages the first retainer surface 122 and a second friction surface 148 which engages the second retainer surface 134.

The support member 128 includes a pair of washers comprising Belleville springs 150 having a back-to-back orientation with respect to one another disposed between the end and spring surfaces 124, 136, as shown in FIG. 10. The Belleville springs 150 urge the support member 128 in the axial direction into engagement with the friction pad 138. This results in the friction pad 138 being resiliently compressed between the support member 128 and shaft retainer 118. The life and durability of the friction pad 138, support member 128 and shaft retainer 118 are inversely proportional to the compressive forces to which they are subjected. However, it is desirable for the compressive forces to be sufficiently large to maintain the friction pad 138, support member 128 and shaft retainer 118 in contact with one another since separation between them can allow them to vibrate.

A switch 92b is mounted on the rear stop 78b, as shown in FIGS. 10 and 13. The portion of the shaft stop 50b which engages the first and second contacts 94b, 95b is electrically conductive so that contact between them enables an electrical current to flow between the first and second contacts via the shaft stop to produce the nonactuating signal. Thus, the sandwiching results in the switch 92b producing the nonactuating signal.

The electrical current flow is interrupted when the shaft 12b is forwardly rotated away from the rearmost position wherein the shaft stop 50b is disengaged from the first and second contacts 94b, 95b. This causes the switch 92b to produce the actuating signal.

An inner shaft sensor 34b is connected to the support means 24b and is adapted to produce an electrical signal proportional to the angular displacement of the shaft 12b with respect to the support means. The shaft sensor 34b preferably includes three shaft sensor elements, as described above with respect to inner shaft sensor 34.

In operation, when the operator depresses the pedal, the shaft 12b forwardly rotates away from the rearmost position causing the shaft stop 50b to disengage from the switch 92b. The friction pad 138 resists relative rotation of the shaft 12b with respect to the support means 24b. The shaft sensor 34b produces a position signal proportional to the angular displacement of the shaft 12b. The position signal is detected by the electronic control system which normally controls the vehicle in accordance with the position signal. The switch 92b produces an actuating signal when the shaft stop 50b is disengaged from it.

When depression of the pedal ceases, the return spring 82b urges the shaft collar 42b to backwardly rotate toward the rearmost position. When the shaft 12b reaches the rearmost position, the shaft stop 50b engages the switch 92b. The switch 92b produces a nonactuating signal when the shaft stop 50b is engaged with it.

The actuating/nonactuating signal produced by the switch 92b is also detected by the electronic control system.

Alternative embodiments of the lever module 10, 10a, 10b can also be used with a vehicle driven by an electric motor instead of an engine wherein the electric signals produced by sensors 34, 34a, 34b, 36 and switches 92, 92b are used to control the output of the electric motor. Moreover, the lever module 10, 10a, 10b can be used in other applications to sense the movement of a lever.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

The embodiments of the invention in which an exclusive property or privilege is claimed are defined as follows:

1. A remote control lever module comprising:
   a support member having an opening;
   a rotating structure having a shaft axle portion extending through said opening and adapted to rotate with respect to said support member;
   a return spring biasing said structure toward rotation in one direction with respect to said support member;
   a sensor mounted on said support member for producing an electrical signal indicative of rotation of said structure;
   and a resistance pad disposed between said structure and said support member, said pad having a first surface engaging said structure to resist rotation of said structure relative to said pad;
   wherein said pad is adapted to rotate about the axis of said shaft axle portion with respect to both said structure and said support member, and wherein said pad has a second surface engaging said support member to resist rotation of said pad relative to said support member, whereby said return spring causes said shaft to rotate in said one direction despite excessive resistance to rotation of said structure relative to said pad or of said pad relative to said support member.

2. A remote control lever module comprising:
   a support member having an opening;
   a rotation structure having a shaft axle portion extending through said opening and adapted to rotate with respect to said support member;
   a return spring biasing said structure toward rotation in one direction with respect to said support member;
   a sensor mounted on said support member for producing an electrical signal indicative of rotation of said structure;
   and a resistance pad disposed between said structure and said support member, said pad having a first surface engaging said structure to resist rotation of said structure relative to said pad;
   and wherein a bearing assembly has an outer race secured in said opening and an inner race surrounding said shaft portion and spaced from said shaft portion to permit said shaft portion to rotate within said inner race, whereby said return spring causes said structure to rotate in said one direction despite excessive resistance to rotation of said inner race within said outer race.

3. A remote control lever module comprising:
   a support member having an opening;
   a shaft extending through said opening and adapted to rotate with respect to said support member, and a radially extending disk rotatable with said shaft;
   a return spring biasing said shaft toward rotation in one direction with respect to said support member;
   a sensor mounted on said support member for producing an electrical signal indicative of rotation of said shaft;
   and a resistance pad disposed about said shaft and extending radially between said disk and said support member, said pad having a first surface engaging said disk to resist rotation of said shaft relative to said pad;

wherein said pad is adapted to rotate about the axis of said shaft with respect to both said shaft and said support member, and said pad has a second surface engaging said support member to resist rotation of said pad relative to said support member, whereby said return spring causes said shaft to rotate in said one direction despite excessive resistance to rotation of said shaft to said pad or of said pad to said support member;

and wherein a bearing assembly has an outer race secured in said opening and an inner race disposed about said shaft and spaced from said shaft to permit said shaft to rotate within said inner race, whereby said return spring causes said shaft to rotate in said one direction despite excessive resistance to rotation of said inner race within said outer race.

* * * * *